(12) United States Patent
Radick et al.

(10) Patent No.: US 6,563,572 B1
(45) Date of Patent: May 13, 2003

(54) CORRELATING SHACK-HARTMANN WAVEFRONT SENSOR

(75) Inventors: Richard R. Radick, Alamogoroo, NM (US); Thomas R. Rimmele, Sunspot, NM (US); Christopher K. Richards, Sunspot, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 104 days.

(21) Appl. No.: 09/721,080

(22) Filed: Dec. 7, 2000

(51) Int. Cl.[7] .................................................. G01J 1/00
(52) U.S. Cl. ....................................................... 356/121
(58) Field of Search ................................ 356/121, 124, 356/124.5; 382/103

(56) References Cited

U.S. PATENT DOCUMENTS 6,379,005 B1 * 4/2002 Williams et al. ............ 351/211

* cited by examiner

Primary Examiner—Michael P. Stafira
(74) Attorney, Agent, or Firm—William G. Auton (57) ABSTRACT

A Correlating Shack-Hartmann wavefront sensor developed for the solar adaptive optics systems. The correlation tracker as an image stabilization technique compares a real time image with a stored reference image using a fast cross-correlation calculation. Trackers of this sort are gradually coming into widespread use at solar observatories. On of their most useful features is their ability to track an extended, low contrast, temporally evolving scene.

2 Claims, 8 Drawing Sheets

FIG. 6

CORRELATING SHACK-HARTMANN WAVEFRONT SENSOR

STATEMENT OF GOVERNMENT INTEREST

The invention described herein may be manufactured and used by or for the Government for governmental purposes without the payment of any royalty thereon.

BACKGROUND OF THE INVENTION

The present pertains to a Correlating Shack-Hartmann wavefront sensor High resolution observations of the Sun have become increasingly important for solving many of the outstanding problems in solar physics. Near diffraction limited snapshot images taken for example at the 76 cm Vacuum Tower Telescope (VTT) at Sacramento Peak show an amazing amount of fine structure. In these images, small magnetic flux elements are visible as bright points. Images of this quality are rare. More importantly, in order to study the physics of these flux elements, or solar fine structure in general, spectroscopy, and polarimetry of the fine structure is required. The exposure times are then typically of order 1 second and the resolution currently achieved in spectroscopic/polarimetric data on a more or less regular basis is typically 0."5–1".0, which is insufficient to effectively study solar fine structure. NSO is in the process of implementing adaptive optics at the VTT, which will allow diffraction limit spectroscopy and increase the scientific productivity of this high resolution facility.

Further motivation for the development of solar adaptive optics is provided by theoretical model predictions. Sophisticated simulations of magneto hydrodynamic processes predict structure below the resolution limit of current solar telescopes, which have apertures of order 1 meter. These theoretical predictions are reinforced by polarimetric measurements, which provide a filling factor (the ratio of magnetic to non-magnetic area) and thus give an indirect measurement of the size of the magnetic elements present in the solar surface. Observations of solar structures below the resolution limit of about 0."2 of current solar telescopes are needed to study the important physical processes that occur on such small scales. A new generation solar telescope with a substantially increased aperture is needed. Solar telescope designs with apertures between 2.5 and 4 mm are being discussed. However, adaptive optics is essential to achieve consistent spatial resolution of $\leq 0."1$ from ground based observatories.

The Hartmann test was developed a century ago as a method for aligning large optical systems. About 30 years ago, Shack had the idea of replacing the perforated screen with a lenslet array, thereby allowing the entire system pupil to be sampled. By adding quadrant detectors or a fast readout CCD to detect the lenslet images, the ordinary Shack-Hartmann wavefront sensor was developed.

This WFS is now widely used, but its main limitation is that it is restricted to point sources as sensing targets. This became a principle driver for the development of high power laser beacons at SOR and elsewhere.

The present invention is a Correlating Shack-Hartmann wavefront sensor developed for the solar adaptive optics systems. We developed the correlation tracker as an image stabilization technique. This tracker compares a real time image with a stored reference image using a fast cross-correlation calculation. Trackers of this sort are gradually coming into widespread use at solar observatories. One of their most useful features is their ability to track an extended, low contrast, temporally evolving scene. The development of adaptive optics for solar imaging has always been held back by the lack of a wavefront sensor capable of functioning with an extended scene as its target. The solar disk is too bright for laser beacons. We realized some years ago that by replacing each simple quadcell or equivalent detector in the standard Shack-Hartmann WFS with a correlation tracker, we could build an extended source WFS—what we now call the "Correlating Shack-Hartmann" WFS. The main technical hurdles were obtaining a large format, fast readout CCD.

The task of providing a Correlating Shack-Hartmann WFS system is alleviated, to some extent, by the following U.S. Patents, the disclosures of which are incorporated herein by reference:

U.S. Pat. No. 5,912,731, Jun. 15, 1999, Hartmann-type optical wavefront sensor, DeLong, Raymond K.,6

U.S. Pat. No. 5,610,707, Mar. 11, 1997, Wavefront sensor for a staring imager, Duncan, Alan U.S. Pat. No. 5,598,261, Jan. 28, 1997, Wavefront sensor for a scanning imager, Duncan, Alan L U.S. Pat. No. 5,300,766, Apr. 5, 1994, Scanning scene-based wavefront sensor having a linear image sensor array and a pupil sensor array, Granger, Edward M.

U.S. Pat. No. 5,146,073, Sep. 8, 1992, Linear wavefront sensor camera with deformable mirror for recording velocity compensated images et al.

The above-cited patents disclose scanning scene-based wavefront sensors. A need remains to provide scanning scene-based wavefront sensor system that can be used as a solar imager. The present invention is intended to satisfy that need.

SUMMARY OF THE INVENTION

The present invention is a Correlating Shack-Hartmann wavefront sensor developed for the solar adaptive optics systems. We developed the correlation tracker as an image stabilization technique. This tracker compares a real time image with a stored reference image using a fast cross-correlation calculation. Trackers of this sort are gradually coming into widespread use at solar observatories. One of their most useful features is their ability to track an extended, low contrast, temporally evolving scene.

It is an object of the invention to provide a Correlating Shack-Hartmann wavefront sensor developed for an image stabilization tracker that compares a real time image with a stored reference image using a fast cross-correlation calculation.

These objects together with other objects, features and advantages of the invention will become more readily apparent from the following detailed description when taken in conjunction with the accompanying drawings wherein like elements are given like reference numerals throughout.

DESCRIPTION OF THE DRAWINGS

FIG. 6 is the present invention.

DETAILED DESCRIPTION OF THE PREFERRED EMBODIMENT

The present invention is Correlating Shack-Hartmann wavefront sensor developed for an image stabilization tracker that compares a real time image with a stored reference image using a fast cross-correlation calculation.

The reader's attention is now directed towards FIGS. 1a–1f, which illustrate temporal power spectra of Zernike coefficients obtained at the Sac Peak site during typical seeing conditions. The data were taken at the VTT during typical seeing conditions using a correlating SH-WFS. The data were recorded at an 800 Hz rate; the processing was done post-facto. Although the cut-off frequency in these power spectra is at about 10–20 Hz, there is signal with a sufficient signal-to-noise ratio out to about 200 Hz. A system bandwidth of about 200 Hz is desirable, which requires an update rate of $\geq 2$ kHz.

The NSO adaptive optics system will consist of the following main components:

A 97 actuator deformable mirror built by xinetics Inc. The PMN actuators are operated in a stable temperature environment of about 20° C. Under these conditions the PMN actuators provide low ($\leq 1\%$) hysteresis and good linearity.

A reconstructor based on commercial off-the-shelf DSPs.

A correlating Shack-Hartmann wavefront sensor. This is the only component that substantially differs from Shack-Hartmann based nighttime AO systems and warrants a more detailed description.

The principle of a correlating SH-WHS is shown in FIG. 2. The telescope aperture is sampled by an array of lenslets, which in turn forms an array of images of the object. In this case the object is granulation. The subaperture size is 7 cm and diffraction limits the rms contrast of the granulation images to 2.5–3%, depending on the seeing conditions, compared to 6–8% when imaged through the full aperture of the VTT. Nevertheless, the image contrast is sufficient to compute cross-correlations between subaperture-images and a selected subaperture-image, which serves as reference. Cross-correlations are computed using:

$$CC(\Delta_i) = \Sigma\Sigma I_M(\bar{x}) \times I_R(\bar{x}+\Delta_i)$$

where $I_M(\bar{x})$ is the subaperture image $I_R(\bar{x})$ is the reference image and $\Delta_i$ is the pixel shift between image and reference. The number of shifts between reference and image can be limited to just a few pixels in either direction, assuming the local tilts are small, i.e., the number of sums that have to be computed can be limited to a small number. Typically a $\Delta_i$ of $\pm 2$ or $\pm 3$ is sufficient, in particular once the control loop is closed. Alternatively, an FFT based algorithm could be used to compute the cross-correlations.

Figure 6:
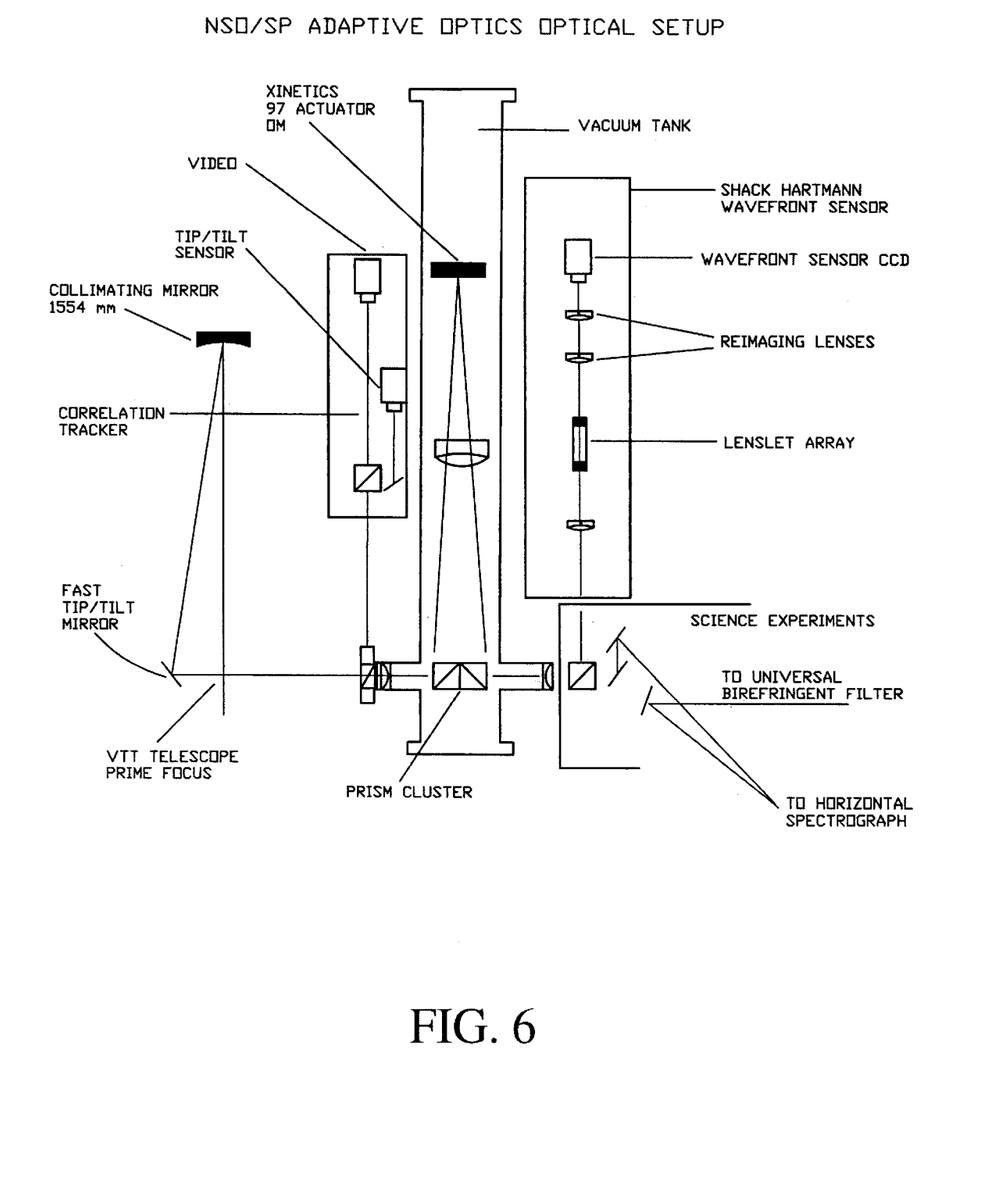

These cross-correlations are shown in FIG. 6 upper right. By locating the maximum of the cross-correlation we determine the displacement of the images with respect to the reference, thereby measuring the local wavefront tilts. The pixel resolution in the SH-WFS images and the 2-D cross-correlations, respectively, is typically 0."5. The FOV is about 8". Image displacements are computed to subpixel precision by fitting a parabola to the correlation peak using and interpolating between pixels. A tilt map is shown in the lower right corner of FIG. 2 which is FIG. 2d.

As mentioned in the introduction we have taken a number of intermediate steps toward the final goal of implementing a $\approx 80$ Zernike mode AO system at the VTT.

Tip/tilt correction.

For several years we have implemented and perfected tip/tilt correction using a correlation tracking algorithm. The basic principal and the technology is similar to what is needed in a correlating SH-WFS. In fact, the correlation tracker (CT) can be regarded as a single channel or building block of a SH-WFS. Recently we completed the development of a MARK II CT system using off-the-shelf components. This CT system has a bandwidth 70 Hz closed-loop bandwidth (3 dB cross-over) and is able to track granulation images formed through a 7 cm subaperture during reasonable seeing conditions.

DWFS experiments.

We deconvolved solar images using the wavefront information delivered by the correlating SH-WFS. This work is described in a separate paper. Based on these experiments we are convinced that the correlating SH-WFS accurately measures the wavefront.

Active optics.

Figure 1A:
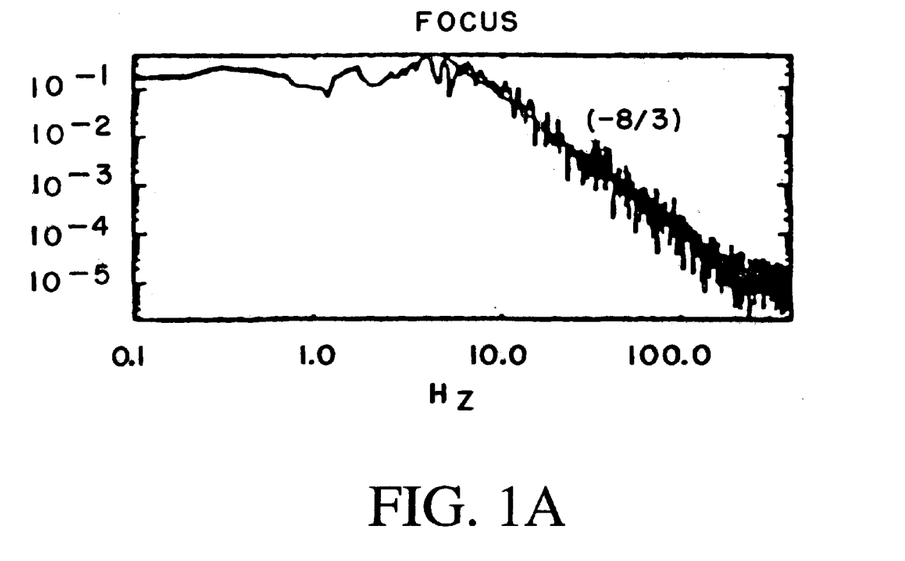
FIGS. 1a–1f are charts of temporal power spectra of Zernike coefficients obtained at the Sac Peak site during typical seeing conditions.
Figure 1B:
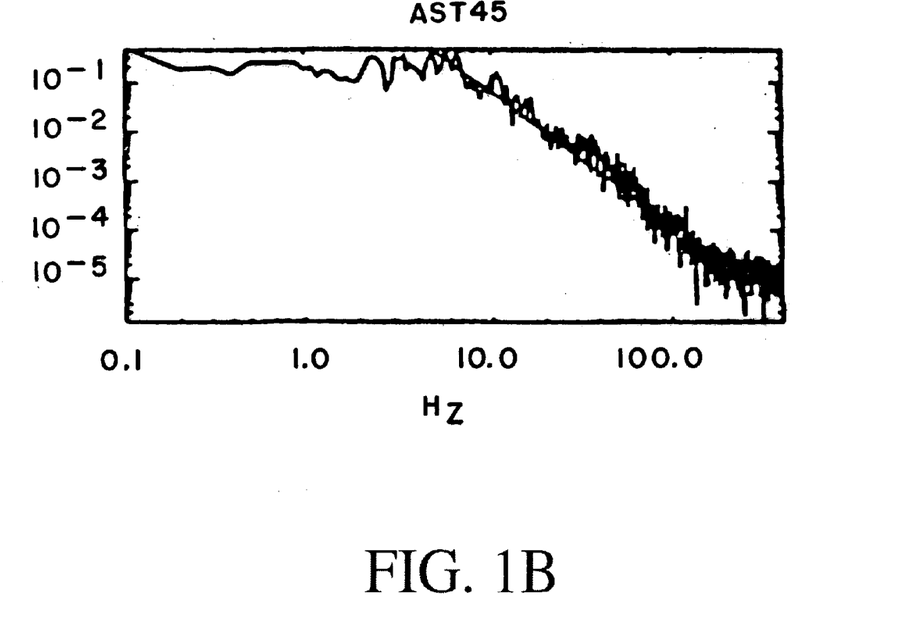
Figure 1C:
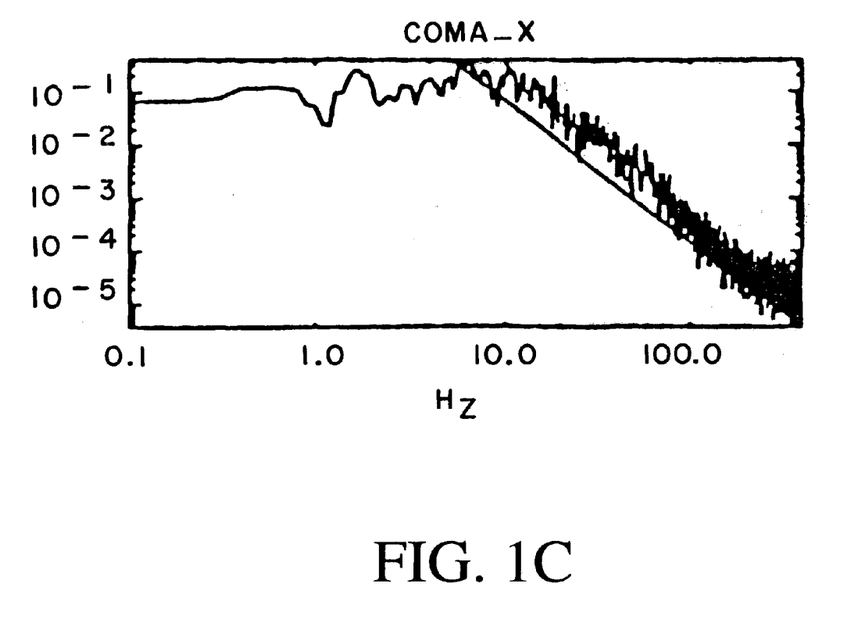
Figure 1D:
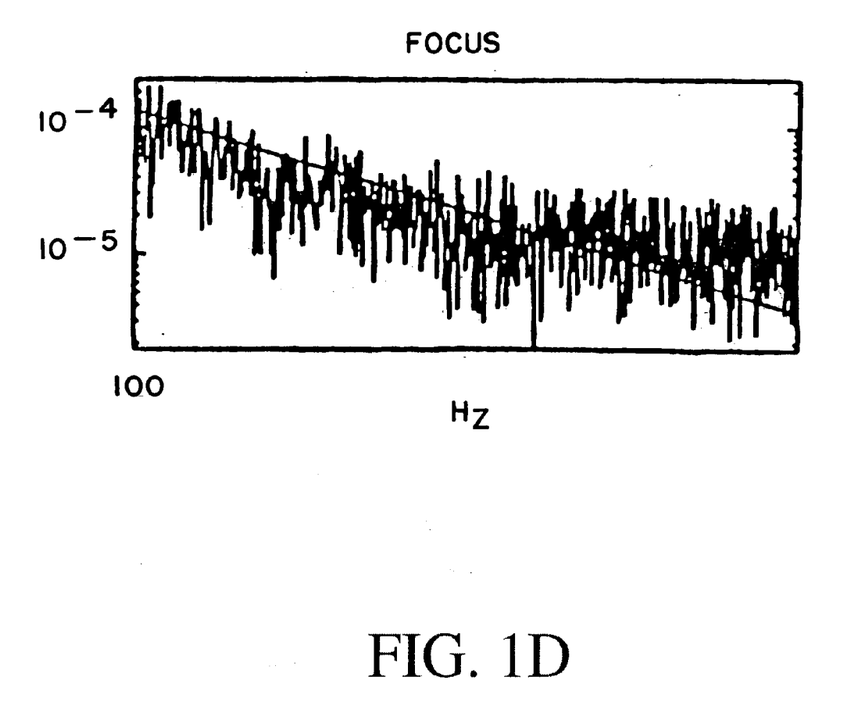
Figure 1E:
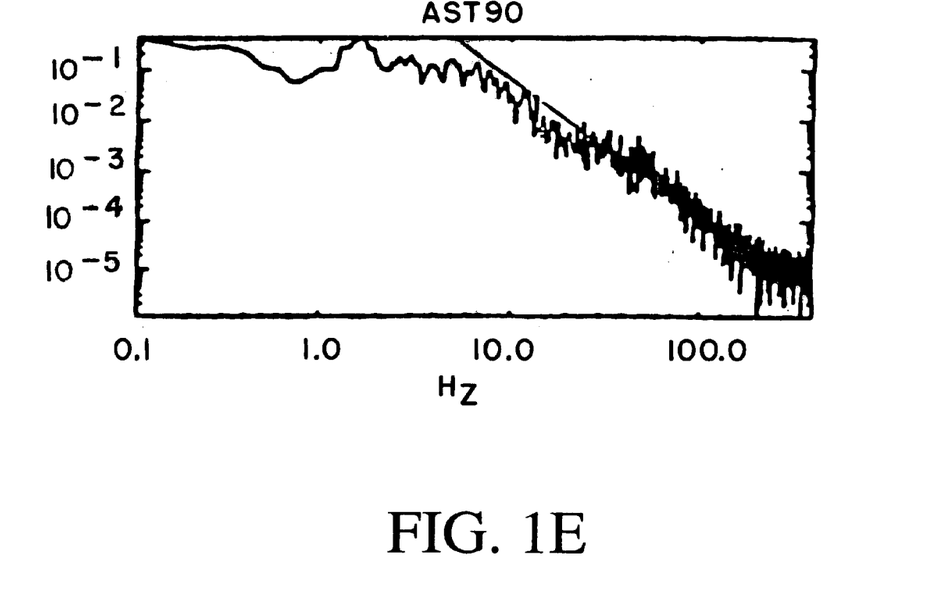
Figure 1F:
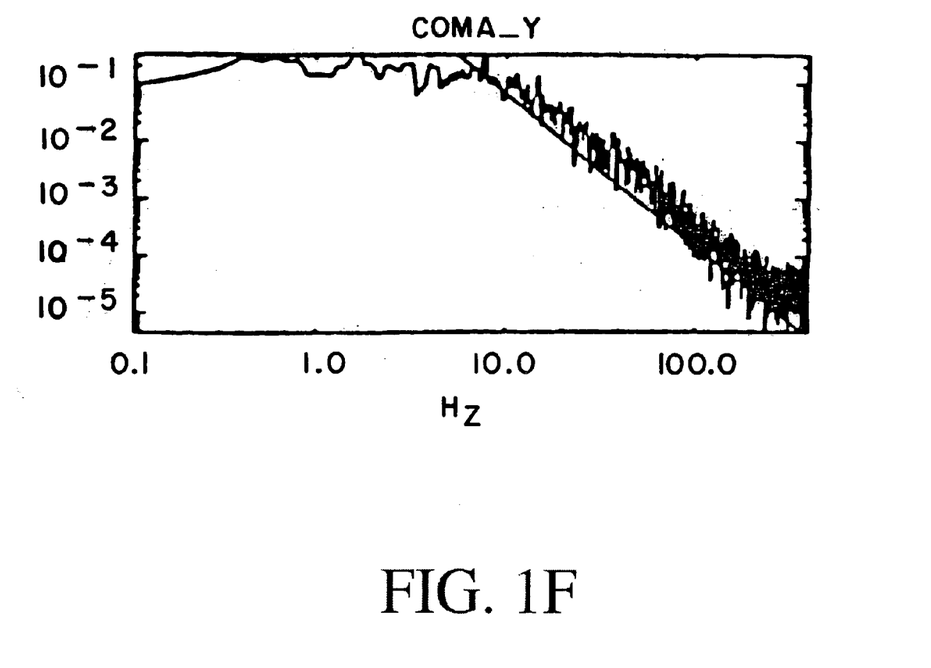
Figure 2A:
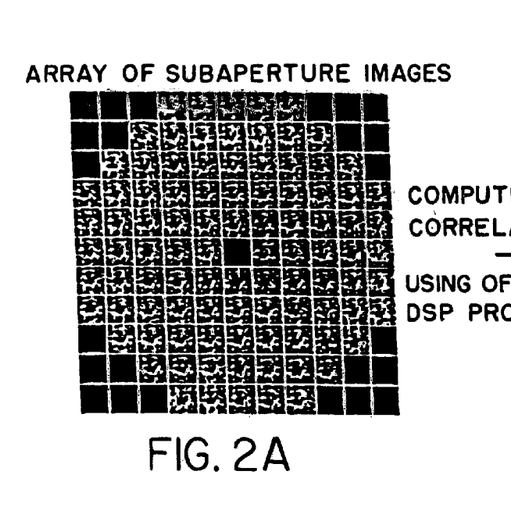
FIGS. 2a and 2b are illustrations of an array of such aperture images and 2d correlation.
Figure 2B:
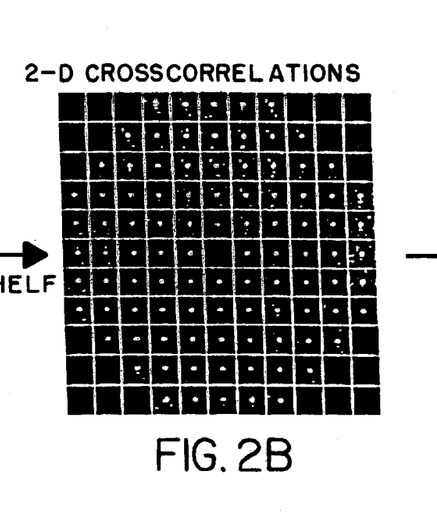
Figure 2C:
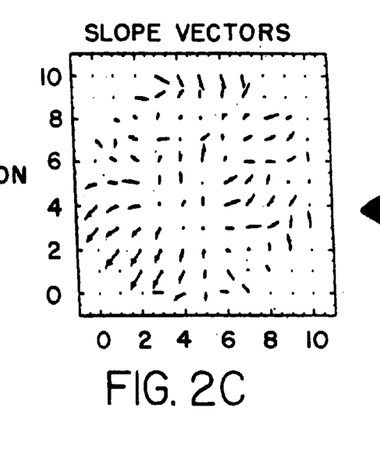
FIGS. 2c and 2d respectively show shift vectors derived from a tilt map using a model reconstruction scheme.
Figure 2D:
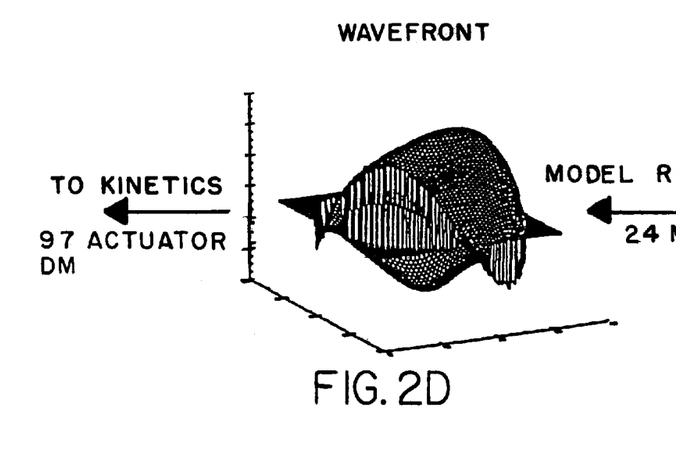
Figure 3:
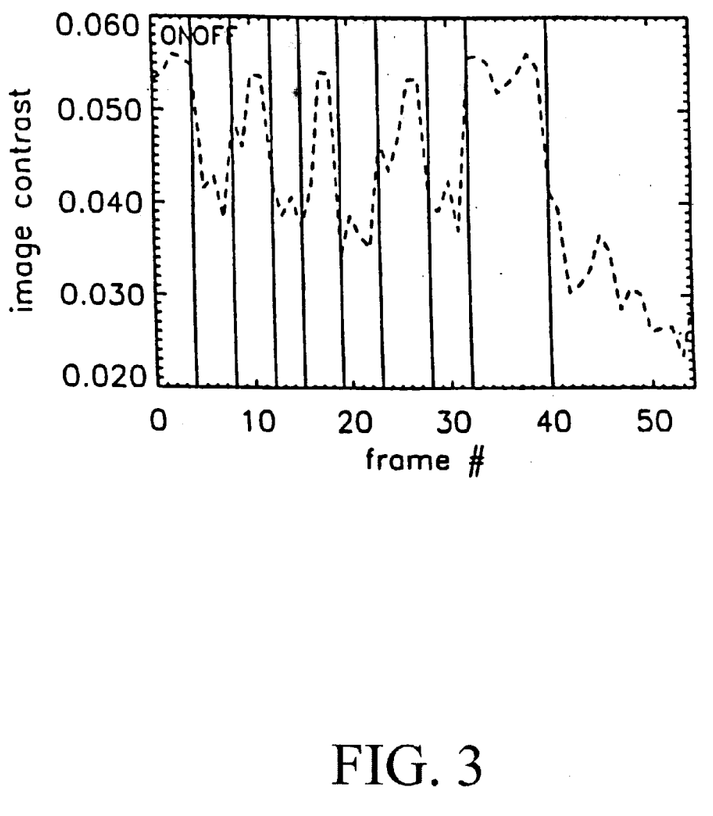
FIG. 3 is a chart of Rms Image contrast of granulation images: corrected using active optics, and uncorrected.
Figure 4:
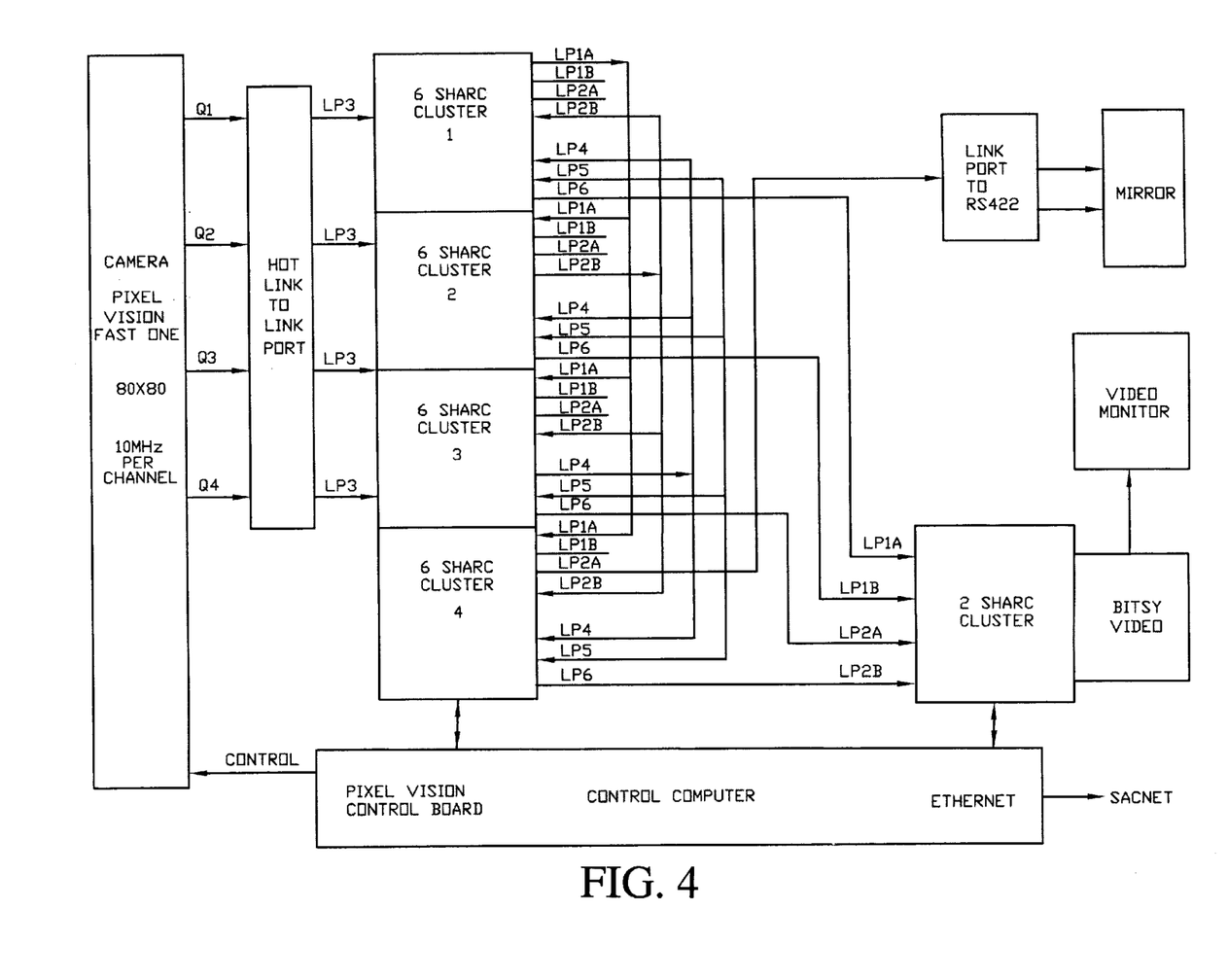
FIG. 4 is a block diagram of the invention as a low order solar adaptive optics system.

The optical figure of modem large aperture nighttime telescopes is controlled by active optics. Active control of the telescope optics will also be required for a future, large solar telescope. The development of an active optics system that works on solar granulation is an important step toward demonstrating the technological feasibility of such a telescope. An active optics system can, of course, also compensate and residual aberrations in the VTT optics. Furthermore, active optics can be considered an intermediate step toward an adaptive optics system. In principle active optics is an adaptive optics system operating at a low bandwidth, on the order of $\geq 10$ Hz, while atmospheric correction requires a closed loop bandwidth of a few hundred Hertz. The active optics system therefore provides a convenient platform for further development of a full atmospheric compensation system for use in solar imaging. During March, 1997, the control loop of the NSO active optics system was closed for the first time at the VTT. Granulation was used as target to perform the wavefront sensing using the correlating SH-WFS described above. The ability of the active optics system to improve the resolution performance of the VTT using both a small sunspot and granulation as the wavefront sensing target was successfully demonstrated. FIG. 4 shows corrected and uncorrected g-band (430 nm) solar granulation images, obtained under comparable seeing conditions. As a more quantitative measure of image quality we plot in FIG. 3 the rms contrast of granulation images taken with and without active optics operating. The effect of the active correction is evident. The diagnostic output of the active mirror suggests that the corrected telescope was compensated to better than $\frac{1}{10}\lambda$ rms by the active optics system during this test.

Low order adaptive optics.

As the next logical step the NSO is now in the process of implementing a low order adaptive optics system.

We have designed and are now in the process of implementing a low order AO system that will be capable of correcting of order 20 Zernike modes. The design was driven by the following philosophy:

parallel processing: The SH-WFS design is ideally suited for a parallel processing approach.

one processor per channel: This results in a simple and clean architecture and allows the system to be scaled up to a higher order AO system.

FIGS. 2a–2d illustrate the principle of correlating Shack-Hartmann wavefront sensor working on granulation. Top Left: Granulation images formed by a lenslet-array. The aperture (76 cm) was sampled with 11 square subapertures resulting in a subaperture diameter of 7 cm. The central subaperture is fully obstructed by the pick-off mirror for the VTT guiding telescope beam. The effects of partially illuminated subapertures at the edge of the pupil can be seen in some of the images. Top Right: Cross-correlations derived from images referenced a particular subaperture. Bottom Left: Wavefront derived from tilt map using a model reconstruction scheme.

use of commercial components: The system consists mostly of commercially available off-the-shelf components. Expensive hardware development is avoided.

A block diagram of the low order AO system is shown in FIG. 4. The detector is an 80×80 quad read-out CCD camera built by Pixel Vision Inc. The camera is read out at a 10 Mhz rate/channel. At this rate the read noise is about 20–30 e, which is much higher than the 3e read noise required for nighttime applications. However, since our solar WFS works with broad-band light, on the order of $10^5$ photons can be easily collected within 0.5 ms and the photon noise dominates the read-noise. The basic processing unit is a SHARC DSP (AD21060) from Analog Devices. The processors are arranged in clusters of six DSPs that are mounted on a PCI bus board. The processor boards are off-the-shelf items. The data from the camera is transmitted to the processor units via the processor's LinkPort interface. The latency usually involved in transmitting data across the PCI bus is avoided. Some minor in-house custom design work is required in order to interface the camera outputs (HotLink) to the DSP processors (LinkPort). All processors are inter-connected via HotLink ports; data can be easily exchanged between processors. A separate board with two SHARC DSPs is used to perform support functions such as displaying Shack-Hartmann images, cross-correlations, and tilt-vector maps. These functions can be performed without interrupting or slowing the actual processing of Shack-Hartmann images.

Figure 5:
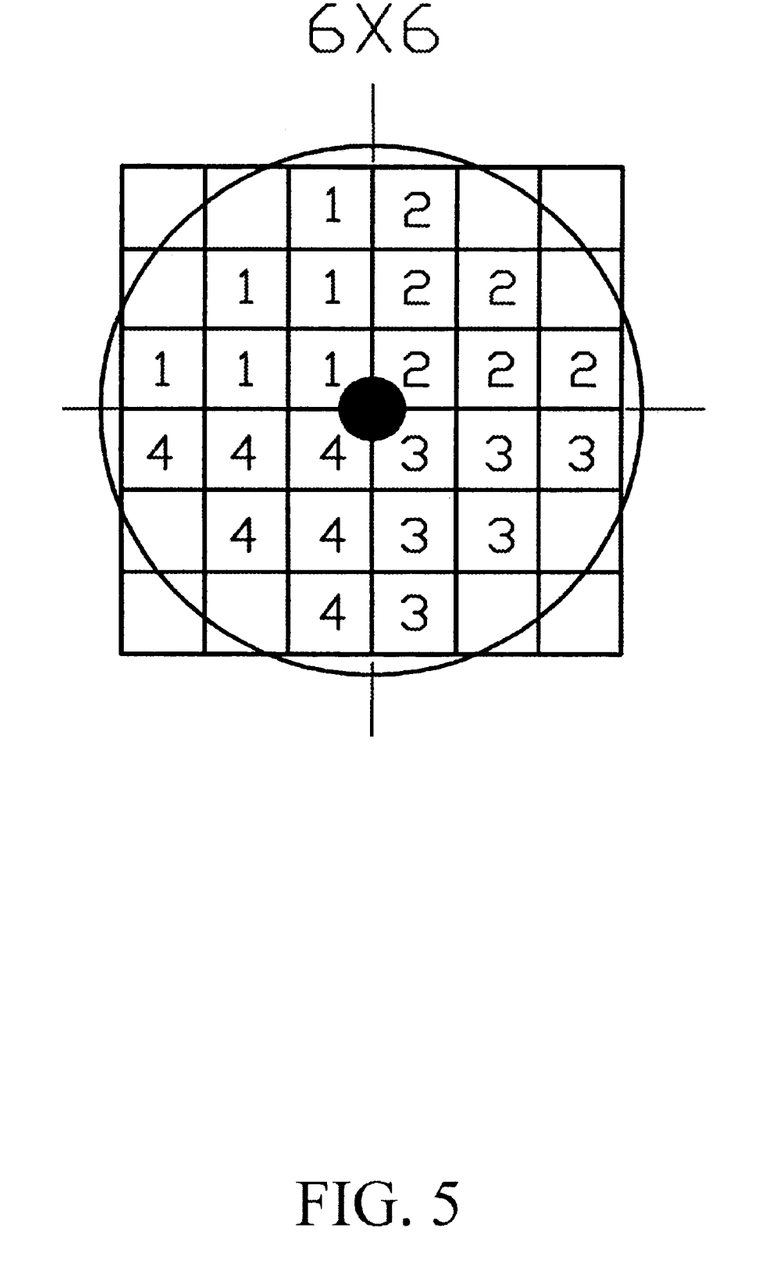
FIG. 5 illustrates Shack-Hartmann wavefront sensor geometry for a low order AO system.

The system is flexible enough so different wavefront sensor geometries can be implemented. We are currently implementing a wavefront sensor with 24 subapertures. The WFS geometry is shown in FIG. 5. In this geometry the subaperture images are 12×12 pixels with a FOV of about 6"×6". We have performed simulations that show that this image size is sufficient to compute the cross-correlations. We also plan to experiment with a WFS geometry that limits the number of subapertures to 21, i.e., five subapertures across the pupil diameter. In this case the subaperature image size is 16×16 pixels resulting in a better S/N-ratio for the wavefront measurements.

The size of the matrices involved in the reconstruction is relatively small and the reconstruction can be performed using the same DSPs used to compute the tilt vector maps. The update rate of the system will be 2 kHz; we hope to achieve a closed loop bandwidth of 150–200 Hz.

Due to the parallel architecture expanding the system to a higher order AO system (≈80 Zernike modes) should be straightforward. This will be achieved by adding more processors for processing the additional subapertures and a larger format CCD camera with more read-out channels. The system bandwidth is more or less limited by the update rate and servo delay achieved for a single channel.

FIG. 5 illustrates Shack-Hartmann wavefront sensor geometry for the low order AO system. The central obscuration is due to the pick-off mirror that directs light to the guiding telescope of the VTT. The subapertures are numbered by the DSP cluster receiving the data.

The optical layout that is currently being installed at the VTT/SP for both active and adaptive optics experiments is shown in FIG. 6; it has been adapted from an earlier design. A separate image motion compensation system provides tip/tilt corrected images to the adaptive optics system. Tip/tilt correction is achieved using a correlation tracker, which is described elsewhere. Both tip/tilt and wavefront sensing operate with broadband (10 nm FWHM) visible light at about 500 nm and only a few percent ($\leq 5\%$) of the light is directed to the correlation tracker and SH-WFS, respectively. The DM is mounted in a tank, that can be evacuated to prevent internal seeing due to solar heating of the DM. A prism arrangement directs the light to the DM where a 70 mm diameter image is formed of the 760 mm entrance window of the VTT. A second prism redirects the light onto an optical bench, where the science experiments are performed. Several post-focus instruments, such as a high resolution spectrograph, narrow-band Lyot- and/or Fabry-Perot filters, and CCD-detectors can be fed with the corrected beam.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A correlating Shack-Hartmann wavefront sensor comprising:

a wavefront sensor charge coupler device (CCD) which outputs a fast read-out CCD signal in response to detected images;

a lenslet array which processes the fast read-out CCD signal from the wavefront sensor charge coupler device to output a lenslet image signed; and a tracker means which compares the lenslet image signal with a stored reference image using a fast correlation calculation, said tracker means thereby obtaining and storing successive image data and cross-correlations between successive image data.

2. A correlating Shack-Hartmann wavefront sensor, as defined in claim 1, wherein said tracker means comprises a data processor which is programmed to compute cross-correlations between subaperture-images and a selected subaperture-image, which serves as references. Cross-correlations are computed using:

$$CC(\Delta_i) = \Sigma\Sigma I_M(\bar{x}) \times I_R(\bar{x} + \Delta_i)$$

where $I_M(\bar{x})$ is a subaperture image $I_R(\bar{x})$ is a reference image and $\Delta_i$ is a pixel shift between image and reference.

* * * * *